Patented Dec. 3, 1946

2,412,148

UNITED STATES PATENT OFFICE 2,412,148

FUEL BARRIER

Albert Hershberger, Kenmore, N. Y., assignor to E. I. du Pont de Nemours & Company, Wilmington, Del., a corporation of Delaware No Drawing. Application September 21, 1942, Serial No. 459,188

6 Claims. (Cl. 154—43.5)

This invention relates to improvements in the structure of self-sealing fuel tanks. More particularly, the invention relates to an improved fuel barrier for self-sealing fuel tanks of airplanes.

Certain compounded stocks of butadiene copolymers, such as the copolymers of acrylonitrile with butadiene, are exceptionally resistant to the action of organic solvents, e. g. gasoline, and are now being widely used as the innermost lamina of self-sealing fuel tanks. However, with the advent of gasoline of very high octane rating due to the presence therein of aromatic hydrocarbons, the impenetrability of compounded acrylonitrile butadiene copolymers is no longer entirely satisfactory and the need arises for materials exhibiting still higher resistance to the penetration of these fuel vapors. Obviously, to be of value in airplane fuel tank structures, where lightness and compactness are essential, the fuel barrier must be extremely thin and light so as not to contribute substantially to the volume or weight of the tank. The barrier should also be tough and exhibit a minimum of shattering when the laminated structure is pierced by a bullet.

A principal object of this invention, therefore, is to provide a new and improved fuel barrier for self-sealing fuel tanks. A further object of this invention is to provide an improved method of joining butadiene copolymers or compounded stock containing the same to itself or rubber or rubber-like elements used in self-sealing fuel tank structures. Other objects will be apparent from the description that follows.

The above objects are accomplished by my invention which comprises the application of a liquid composition comprised of a polyvinyl butyral together with thermo-setting, resin-forming ingredients comprised of a polyhydric phenol, an aldehyde and a basic polymerization catalyst, all dissolved in an organic solvent, to butadiene copolymers and causing the resin-forming ingredients to react to form a substantially insoluble, infusible resin. The liquid composition above referred to may be applied to either side of the butadiene copolymer, serving as the innermost lamina of the self-sealing fuel tank structure, or it may be applied so as to be useful as an adhesive as well as a fuel barrier, as will be described hereinafter.

The polyvinyl butyrals useful in this invention are those in which at least 30%, but no more than 80%, of the hydroxyl groups of polyvinyl alcohol are substituted by reacting the butyraldehyde with the polyvinyl alcohol in the known manner. This corresponds to a range of from 20.7% to 44.0% of combined butyraldehyde. Preferably, the polyvinyl butyral is one in which the degree of substitution of the hydroxyl groups is in the range of from 35% to 50% (23.5% to 31.3% of combined butyraldehyde).

The polyvinyl butyrals produced by butyralization of polyvinyl alcohol substantially free of any ester groups are preferred. However, polyvinyl butyrals containing a minor proportion of ester groups may be used with good results.

As the thermo-setting, resin-forming ingredients of the coating or adhesive composition, polyhydric phenols and aldehydes, which are soluble to the extent of 1% to 10% or more in the organic solvent employed, are preferred. The resin should be capable of polymerizing rapidly and completely to a substantially insoluble, infusible form at temperatures of about 125° C. or less. The polyhydric phenols having the hydroxyl groups in the benzene nucleus meta with respect to one another, such as resorcinol, phloroglucinol and orcinol, are preferred. Also suitable are the naturally occurring polyhydric phenols, e. g., the tannins extracted from the bark of the quebracho tree, known as quebracho extract. As the aldehyde member of the resin-forming ingredients, formaldehyde, para-formaldehyde, acetaldehyde, furfural and aldol are especially satisfactory. Preferably, the aldehyde is used in some excess of that theoretically required to react with all the phenol present in order to insure polymerization of all the phenol.

The basic catalyst, to promote polymerization of the resin-forming ingredients, such as NaOH, KOH, etc., in concentrations of 0.5% to 1.5% by weight on the basis of the resin-forming materials is preferred.

The ratio of the partial polyvinyl butyral to the polyhydric phenol-aldehyde resin-forming ingredients is important. Best results are obtained when the partial polyvinyl butyral is used in concentrations between 30% and 45% of the total weight of the solvent-free coating or adhesive layer, although good results are obtainable when the concentration of the polyvinyl butyral resin is within the range of from 25% to 60% of the total weight of the solvent-free composite layer.

The rubber-like vulcanizable butadiene copolymers, such as the copolymers of acrylonitrile and butadene, when used as the innermost member of a self-sealing fuel tank, are usually mixed or compounded with several other materials, such as pigments, fillers, softeners or plasticizers, accelerators, stabilizers, dispersing agents, aging resistors, sulfur, or the like. The fuel barrier composition of this invention should preferably be applied to the uncured sheet of compounded acrylonitrile butadiene copolymer and the thermo-setting resin therein will easily set up to an insoluble, infusible resin when the butadiene copolymer is cured.

The fuel barrier composition of a polyvinyl butyral and the resin-forming ingredients dissolved in a suitable organic solvent may be applied to the compounded butadiene copolymer stock by spraying, by brushing, by doctoring, or by any other suitable means, and the solvent evaporated at room temperature or at an elevated temperature. At some stage in the drying process or subsequent to drying, it is preferred that the temperature be raised to 65° C., or higher, for a short time to insure polymerization of the resin-forming material to a substantially insoluble, infusible form. However, final heating of the polyhydric phenol-aldehyde resin to the infusible, insoluble state need not take place until the structure is subjected to an elevated temperature to cure the compounded butadiene copolymer.

Where the fuel barrier composition of this invention is used as an adhesive composition as well in the fabrication of laminated structures, the pressure, temperature and time under which the laminated structure is finally set up and the butadiene copolymer cured may, of course, be varied within reasonable limits. It is generally desirable to maintain the structure under reasonably high pressure, for example, at least 100 pounds per square inch, to obtain the best bond but reasonably satisfactory results can be obtained by setting up the structure at substantially lower pressures, e. g., 5 to 10 pounds per square inch. Also, the temperatures of curing will vary, depending on the specific butadiene copolymer and various compounding ingredients in the compounded stock. In some instances, this temperature may range from 80° C. to 160° C. The time may also be varied. At the lower temperatures, it is generally advisable to prolong the period for setting up the structure and curing the butadiene copolymer while at the higher temperatures, the time can be somewhat shorter. While the time may be varied from a few minutes to several hours, in general the time range of 5 minutes to 80 minutes is preferred.

The following examples further illustrate the invention. Parts are by weight.

*Example I*

A liquid composition is prepared by dissolving 15 parts of polyvinyl butyral prepared by combining about 50% of the hydroxyl groups of polyvinyl alcohol with butyraldehyde (31.3% combined butyraldehyde) in 68 parts of methyl alcohol and 17 parts of water, and to this solution is added a solution comprised of 15 parts of resorcinol, 30 parts of formalin (37% formaldehyde in water), 3 parts of 10% solution of NaOH in water, and 80 parts of methanol and 20 parts of water. After thoroughly mixing the two solutions together, the composition is applied to "Hycar" (a compounded acrylonitrile-butadiene copolymer) to form a layer of about 0.0005 inch or less in thickness when dried and set up. The coated "Hycar" is subjected to air-drying for some minutes to evaporate the bulk of the solvent and then another sheet of "Hycar" is applied against the coated surface of the first sheet and the structure pressed together under a pressure of about 250 pounds per square inch and heated to a temperature of 135° C. for 40 minutes while maintaining the pressure. The two sheets of "Hycar" were firmly united and could not be separated without tearing one or the other. Penetration of this structure by vapors of high octane gasoline containing aromatic hydrocarbon was substantially less than through a similar sheet of "Hycar" having a thickness equal to the total thickness of this laminated structure.

By applying a similar coating of the same polyvinyl butyral thermo-setting resin composition to one of the other surfaces of the cured laminated structure and then heating the structure to a temperature of about 65° C. or higher to cause the thermo-setting resin in this composition to set up to an insoluble, infusible form, the impermeability of the structure to high octane gasoline containing aromatic hydrocarbon is still further improved.

*Example II*

The liquid composition of Example I is applied to a sheet of "Hycar" or other compounded acrylonitrile butadiene polymer, and after air-drying for some minutes the coated side is applied to the "Hycar"-coated side of a textile fabric, which fabric has coated on one side a thin lamina of "Hycar" and on the other side a thin lamina of natural compounded rubber, and then the laminated structure is subjected to heat and pressure as in Example I to cure the "Hycar" and to set up the phenol-aldehyde resinous composition to an insoluble, infusible form. The natural rubber side of the laminated structure so prepared can be easily bonded to the natural rubber composition comprising the sealant of self-sealing fuel tanks and, if desired, an additional coating of the fuel barrier composition may be applied to the surface of the "Hycar" that will be directly in contact with the fuel. This final inside coating which comes directly in contact with the fuel may be formed after the tank is made by pouring the liquid composition referred to above into the tank, sloshing it around, to wet and form a coating over the entire inner surface and then draining any excess of the liquid composition from the tank. In fact, if the fuel tank has this coating composition applied only to the fuel side and is used nowhere else in the tank construction, very substantial improvement in impenetrability of aromatic hydrocarbons is obtained as compared with prior art tanks.

Although this invention has been described with reference to coating or joining compounded acrylonitrile butadiene polymers, it is also applicable to the coating or bonding of other copolymers of butadiene, such as the copolymers of styrene and butadiene, and the copolymers of isobutylene and butadiene.

The laminated structures of this invention are especially useful as fuel barriers in self-sealing fuel tanks for military and naval airplanes. The layer of polyvinyl butyral and polyhydric phenol-aldehyde resin serves not only as a very formidable fuel barrier in itself, but also as an adhesive when intermediate two laminae of a butadiene copolymer. Even though the fuel barrier layer of this invention is extremely thin, being no more than 0.0005 inch in thickness, it contributes very substantially to the impermeability of the laminated structure forming the fuel tanks. In fact, it is unnecessary in many cases to form the laminated structure described above but to merely apply a thin coating of the fuel barrier composition to the surface of the "Hycar" directly exposed to the fuel vapors, as explained above. The satisfactory joining of a butadiene copolymer stock containing the same to itself or to another butadiene copolymer provides a laminated structure that is eminently suited for various uses, not only in connection with airplanes and other armaments but also in various fields of civilian use. Furthermore, the preparation of laminated structures in accordance with this invention is simple, and no very high temperature or long period of baking is required to set up the resin in the adhesive.

Since it is obvious that various changes and modifications may be made without departing from the nature and spirit of the invention, it is to be understood that the invention is not to be limited except as set forth in the following claims.

I claim:

1. In self-sealing fuel tanks having an interliner comprising butadiene copolymer, the improvement which comprises a thin layer of a composition comprising essentially (1) a polyvinyl butyral wherein the combined butyraldehyde ranges from 20.7% to 44.0%, and (2) a substantially insoluble, infusible polyhydric phenol-aldehyde resin, firmly bonded to, and in face to face contact with, said interliner of copolymer.

2. In self-sealing fuel tanks having an interliner comprising rubber-like vulcanizable butadiene copolymer, the improvement which comprises a thin layer of a composition comprising essentially (1) a polyvinyl butyral wherein the combined butyraldehyde ranges from 23.5% to 31.3%, and (2) a substantially insoluble, infusible polyhydric phenol-aldehyde resin, firmly bonded to, and in face to face contact with, said interliner of copolymer.

3. In self-sealing fuel tanks having an interliner comprising rubber-like vulcanizable butadiene copolymers, the improvement which comprises a plurality of layers of said polymers firmly bonded together with a composition consisting of (1) a polyvinyl butyral wherein the combined butyraldehyde ranges from 20.7% to 44.0%, and (2) a substantially insoluble, infusible polyhydric phenol-aldehyde resin.

4. In self-sealing fuel tanks having an interliner comprising rubber-like vulcanizable butadiene copolymers, the improvement which comprises a plurality of layers of said polymers firmly bonded together with a composition consisting of (1) a polyvinyl butyral wherein the combined butyraldehyde ranges from 23.5% to 31.3%, and (2) a substantially insoluble, infusible polyhydric phenol-aldehyde resin.

5. As a new article of manufacture a laminated structure comprising laminations of butadiene copolymers bonded together by a composition consisting of (1) a polyvinyl butyral wherein the combined butyraldehyde ranges from 20.7% to 44.0%, and (2) a substantially insoluble, infusible polyhydric phenol-aldehyde resin.

6. As a new article of manufacture a laminated structure comprising laminations of rubber-like vulcanizable butadiene copolymers bonded together by a composition consisting of (1) a polyvinyl butyral wherein the combined butyraldehyde ranges from 23.5% to 31.3%, and (2) a substantially insoluble, infusible polyhydric phenol-aldehyde resin.

ALBERT HERSHBERGER.